US008866636B2

(12) United States Patent
Lee et al.

(10) Patent No.: US 8,866,636 B2
(45) Date of Patent: Oct. 21, 2014

(54) METHOD AND APPARATUS FOR PROVIDING TRAFFIC INFORMATION SERVICE USING A MOBILE COMMUNICATION SYSTEM

(75) Inventors: Eun-Seok Lee, Seongnam-si (KR); Je-Hwan Oh, Seoul (KR); Se-Ra Jang, Seoul (KR); Hyun-Sang Youn, Seoul (KR); Gil-Jong Yoo, Daejeon (KR); Jong-Sun Pyo, Suwon-si (KR); Jin-Won Kim, Seoul (KR)

(73) Assignees: Samsung Electronics Co., Ltd., Suwon-Si (KR); Sungkyunkwan University Foundation, Suwon-Si (KR)

( * ) Notice: Subject to any disclaimer, the term of this patent is extended or adjusted under 35 U.S.C. 154(b) by 172 days.

(21) Appl. No.: 13/083,088

(22) Filed: Apr. 8, 2011

(65) Prior Publication Data

US 2011/0248867 A1 Oct. 13, 2011

(30) Foreign Application Priority Data

Apr. 8, 2010 (KR) ........................ 10-2010-0032166

(51) Int. Cl.

| | |
|---|---|
| ***G08G 1/09*** | (2006.01) |
| ***G01S 1/00*** | (2006.01) |
| ***G06F 19/00*** | (2011.01) |
| ***G08G 1/01*** | (2006.01) |

(52) U.S. Cl.

CPC .................................... *G08G 1/0104* (2013.01)
USPC ........... 340/905; 701/400; 701/412; 701/117; 701/120; 701/443

(58) Field of Classification Search

USPC .......................................................... 340/905
See application file for complete search history.

(56) References Cited

U.S. PATENT DOCUMENTS

| | | | | |
|---|---|---|---|---|
| 6,442,394 | B1 * | 8/2002 | Valentine et al. | 455/456.3 |
| 6,690,292 | B1 * | 2/2004 | Meadows et al. | 340/905 |
| 2007/0124063 | A1 * | 5/2007 | Kindo | 701/208 |
| 2010/0020169 | A1 * | 1/2010 | Jang et al. | 348/115 |
| 2010/0188265 | A1 * | 7/2010 | Hill et al. | 340/905 |
| 2011/0095908 | A1 * | 4/2011 | Nadeem et al. | 340/905 |

FOREIGN PATENT DOCUMENTS

| | | |
|---|---|---|
| KR | 1020020044627 A | 6/2002 |
| KR | 1020080052316 A | 6/2008 |
| KR | 1020090002863 A | 1/2009 |

OTHER PUBLICATIONS

Written Opinion of the International Searching Authority dated Nov. 25, 2011 in connection with International Patent Application No. PCT/KR2011/002486.
International Search Report dated Nov. 25, 2011 in connection with International Patent Application No. PCT/KR2011/002486.

* cited by examiner

*Primary Examiner* — George Bugg
*Assistant Examiner* — Munear Akki

(57) ABSTRACT

A method and apparatus for providing a traffic information service using a mobile communication terminal are provided. A method of a mobile communication terminal for a traffic information service is provided. The method includes constructing a cluster with at least one neighboring Mobile Station (MS), receiving traffic information from the at least one neighboring MS comprised in the cluster, measuring traffic information using location information of the MS, and transmitting a traffic information message comprising the collected traffic information to a traffic information provision server.

20 Claims, 7 Drawing Sheets

METHOD AND APPARATUS FOR PROVIDING TRAFFIC INFORMATION SERVICE USING A MOBILE COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Apr. 8, 2010, and assigned Serial No. 10-2010-0032166, the contents of which are herein incorporated by reference.

TECHNICAL FIELD OF THE INVENTION

The present invention relates to a method and apparatus for providing a traffic information service. More particularly, the present invention relates to a method and apparatus for providing a traffic information service using a mobile communication terminal that supports a Global Positioning System (GPS) function.

BACKGROUND OF THE INVENTION

Today, while the number of vehicles suddenly increases, a traffic jam phenomenon frequently occurs because of road restriction. Accordingly, the conventional art is providing a service of, by detecting and providing the traffic situation of each road to drivers, allowing the drivers to avoid the jammed or congested sections of roads and arrive at a destination within a shorter time.

The conventional art uses a scheme of collecting traffic information of each road using a probe car in order to detect the traffic situation of a road. That is, the conventional art uses a scheme in which, while running a road, a plurality of probe cars collect information of a running time for each road section, a mileage and the like and transmit the collected information to a traffic information server, and the traffic information server detects the traffic situation of each road through the information received from the probe cars.

However, the above scheme has a disadvantage that there is a need for a lot of probe cars to provide real-time traffic situation information to users, and has a disadvantage that the lot of probe cars consumes a huge maintenance cost.

SUMMARY OF THE INVENTION

To address the above-discussed deficiencies of the prior art, it is a primary object to provide a method and apparatus for providing a traffic information service using a mobile communication terminal.

Another aspect of the present invention is to provide a method and apparatus for collecting traffic information through a mobile communication terminal supporting a Global Positioning System (GPS) function.

A further aspect of the present invention is to provide a method and apparatus for allowing a plurality of mobile communication terminals to construct a cluster, collect traffic information, and transmit the traffic information to a traffic information server.

A yet another aspect of the present invention is to provide a method and apparatus for allowing a traffic information server to acquire traffic information through a plurality of mobile communication terminals and provide traffic situation information to a Mobile Station (MS) requiring the traffic information.

The above aspects are achieved by providing a method and apparatus for providing a traffic information service using a mobile communication terminal.

According to one aspect of the present invention, a method of a mobile communication terminal for a traffic information service is provided. The method includes constructing a cluster with at least one neighboring MS, receiving traffic information from the at least one neighboring MS included in the cluster, measuring traffic information using location information of the MS, and transmitting a traffic information message including the collected traffic information to a traffic information provision server.

According to another aspect of the present invention, a method of a mobile communication terminal for a traffic information service is provided. The method includes constructing a cluster with at least one neighboring MS, measuring traffic information using location information of the MS, and transmitting the measured traffic information to a delegate MS of the cluster.

According to a further aspect of the present invention, a method of a traffic information server for a traffic information service is provided. The method includes receiving a traffic information message from at least one MS, searching a corresponding road using location information included in the traffic information message, and generating information representing the traffic situation of the road using the traffic information message. The traffic information message includes at least one of an MS IDentifier (ID), location information, a movement velocity, a movement direction, a movement angle, a movement timestamp, and the number of MSs within a cluster.

According to yet another aspect of the present invention, an apparatus of a mobile communication terminal for a traffic information service is provided. The apparatus includes a location information receiver, a communication unit, and a controller. The location information receiver receives location information of the MS. The communication unit transmits/receives a signal with at least one neighboring MS and a traffic information provision server. The controller controls to construct a cluster with at least one neighboring MS, if traffic information is received from the at least one neighboring MS included in the cluster through the communication unit, measure traffic information using the location information of the MS, and transmit a traffic information message including the collected traffic information to the traffic information provision server.

According to still another aspect of the present invention, an apparatus of a mobile communication terminal for a traffic information service is provided. The apparatus includes a location information receiver, a communication unit, and a controller. The location information receiver receives location information of the MS. The communication unit transmits/receives a signal with at least one neighboring MS and a traffic information provision server. The controller controls to construct a cluster with the at least one neighboring MS, measure traffic information using location information of the MS, and transmit the measured traffic information to a delegate MS of the cluster.

According to still another aspect of the present invention, an apparatus of a traffic information server for a traffic information service is provided. The apparatus includes a communication unit and a controller. The communication unit receives a traffic information message from at least one MS. The controller searches a corresponding road using location information included in the traffic information message, and generates information representing the traffic situation of the road using the traffic information message. The traffic information message includes at least one of an MS ID, location information, a movement velocity, a movement direction, a movement angle, a movement timestamp, and the number of MSs within a cluster.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal that supports a Global Positioning System (GPS) function. In the following description, well-known functions or constructions are not described in detail as they would obscure the invention in unnecessary detail.

Below, embodiments of the present invention provide a method and apparatus for providing a traffic information service using a mobile communication terminal.

Figure 1:
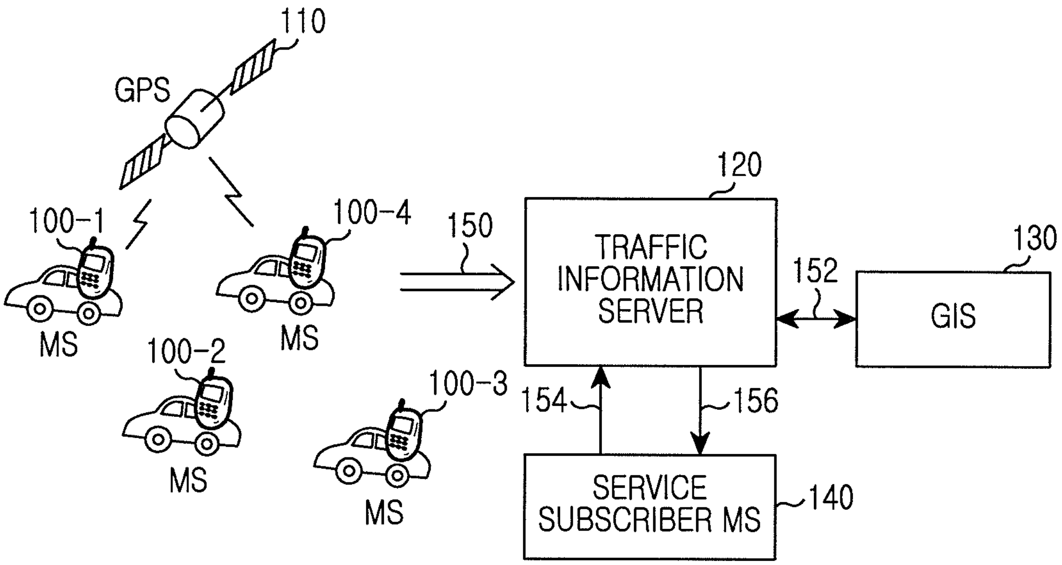
FIG. 1 is a diagram illustrating a construction of a system providing a traffic information service according to principles of the present invention.

FIG. 1 illustrates a construction of a system providing a traffic information service according to principles of the present invention.

Figure 2:
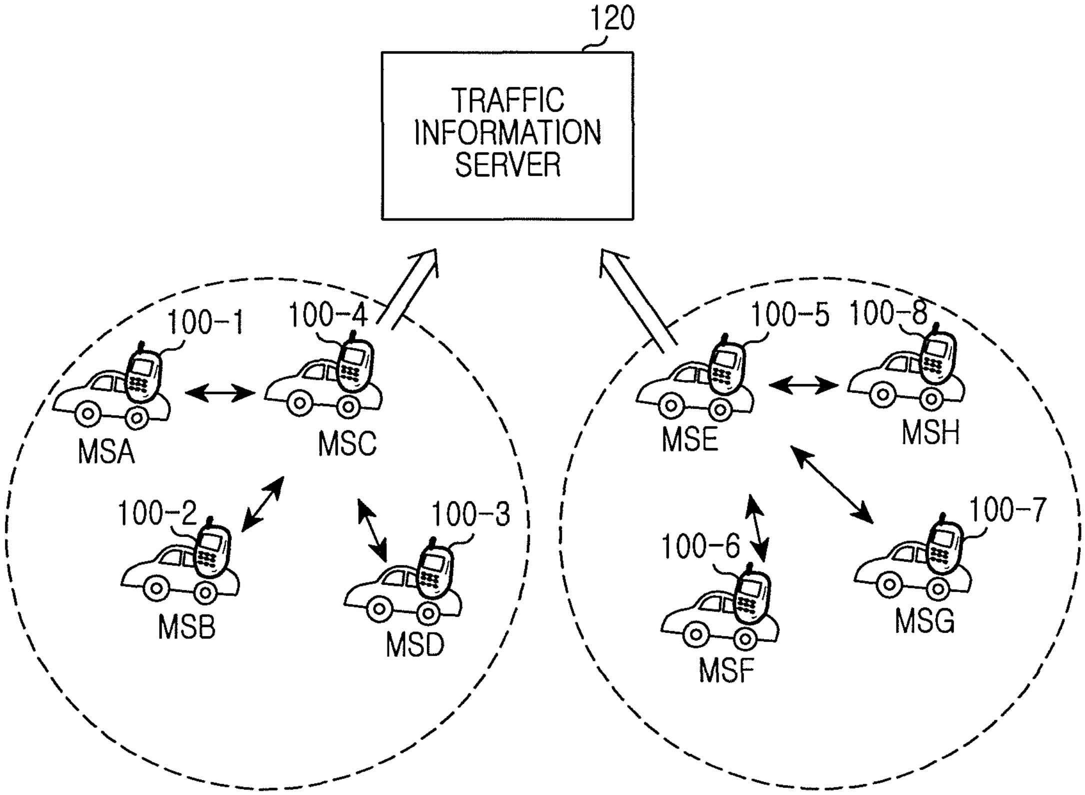
FIG. 2 is a diagram of a cluster construction of mobile communication terminals transmitting traffic information to a traffic information server according to an embodiment of the present invention.

Referring to FIG. 1, a plurality of Mobile Stations (MSs) 100-1 to 100-4 acquire location information from a Global Positioning System (GPS) 110 and collect traffic information (i.e., a movement velocity, a movement direction, a movement angle, and timestamp information) and, in step 150, the plurality of MSs 100-1 to 100-4 transmit the collected traffic information to a traffic information server 120. At this time, the plurality of MSs 100-1 to 100-4 each themselves can transmit their own collecting traffic information to the traffic information server 120 or, after the plurality of MSs 100-1 to 100-4 construct a cluster, one delegate MS representing the cluster can collect traffic information of the remaining MSs and provide the collected traffic information to the traffic information server 120. For example, as illustrated in FIG. 2, a plurality of MSs 100-1 to 100-8 construct two clusters, and delegate MSs 100-4 and 100-5 of the two clusters can collect traffic information of the remaining MSs 100-1 to 100-3 and 100-6 to 100-8, get statistics, and provide the statistics to the traffic information server 120.

If the traffic information is received from the plurality of MSs 100-1 to 100-4, in step 152, the traffic information server 120 searches a road corresponding to the received traffic information through a Geographic Information System (GIS) 130, and generates and updates traffic situation information on the road.

After that, if a service subscriber MS 140 subscribing to a traffic information service transmits a request for traffic situation information on a specific location (or road) to the traffic information server 120 in step 154, the traffic information server 120 provides the requested traffic situation information on the location to the service subscriber MS 140 in step 156.

Below, a procedure of transmitting traffic information to a traffic information server by way of example of when a plurality of mobile communication terminals construct a cluster is described with reference to FIGS. 3 and 4.

Figure 3:
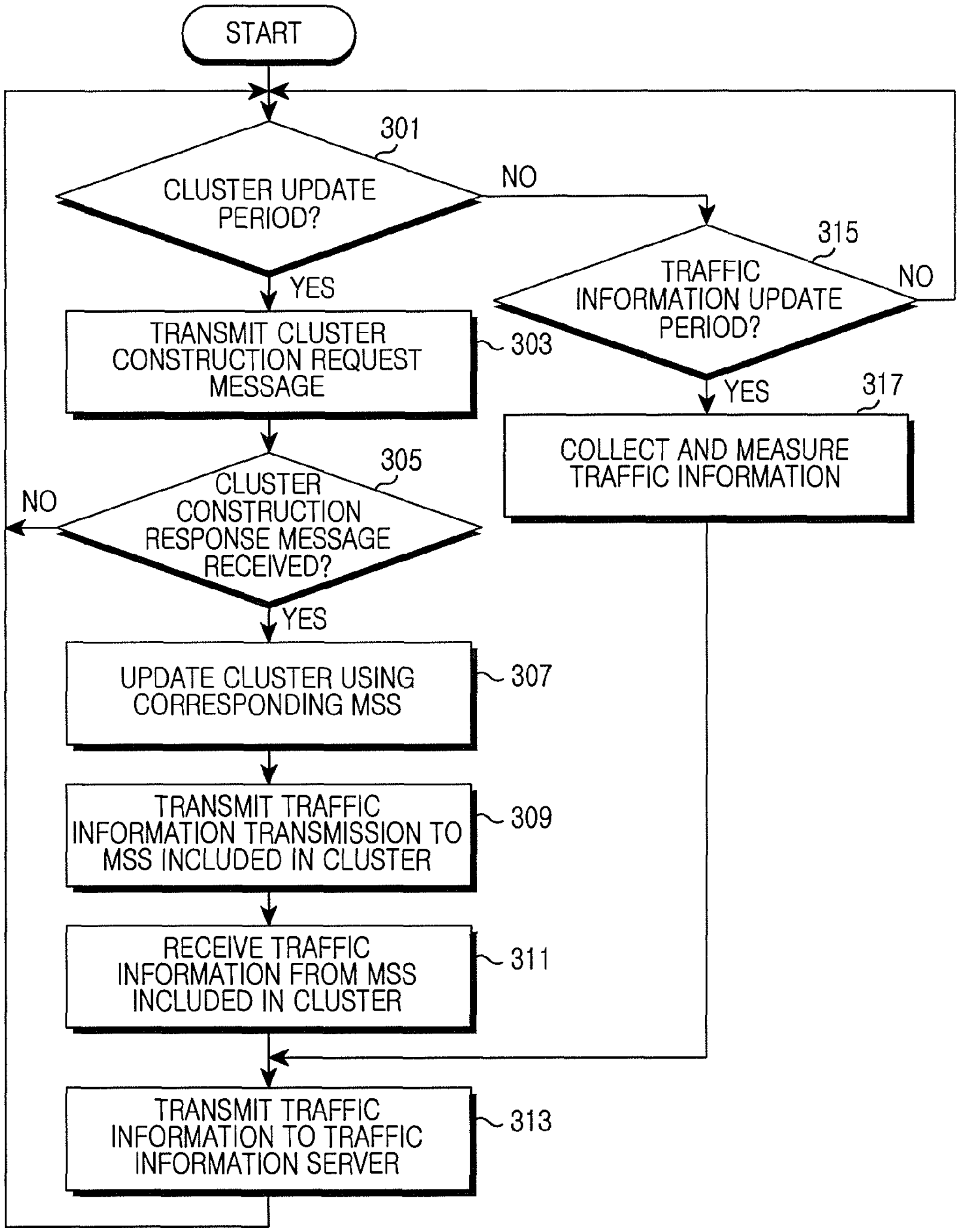
FIG. 3 illustrates a process of constructing a cluster and transmitting traffic information to a traffic information server in a mobile communication terminal according to an embodiment of the present invention.

FIG. 3 illustrates a process of constructing a cluster and transmitting traffic information to a traffic information server in a mobile communication terminal according to an embodiment of the present invention.

Referring to FIG. 3, in step 301, an MS determines if a current time point corresponds to a predetermined cluster update period. When the current time point corresponds to the predetermined cluster update period, the MS proceeds to step 303 and broadcasts a message of requesting cluster construction. At this time, the cluster construction request message includes a unique cluster IDentifier (ID) for identifying a cluster, and movement direction and message transmission timestamp information of the MS.

After that, in step 305, the MS determines if a cluster construction response message is received. When the cluster construction response message is not received, the MS returns to step 301 and again performs the subsequent steps. When the cluster construction response message is received, the MS proceeds to step 307 and generates or updates a cluster using MSs transmitting the cluster construction response messages. That is, the MS constructs the cluster with the MSs transmitting the cluster construction response messages. Here, the cluster construction response message includes an ID of the cluster to which the MS transmitting the cluster construction response message belongs, and message transmission timestamp information. By this, the MS can determine if the cluster construction response message is valid. When the cluster construction response message is not valid, the MS disregards the invalid cluster construction response message. For example, the MS can determine that the cluster construction response message is valid when the cluster ID included in the cluster construction response message is the same as its own cluster ID and a cluster construction response message transmission timestamp is not out of more than a threshold from a current timestamp.

Next, the MS proceeds to step 309 and transmits a request for transmitting traffic information to the MSs included in the cluster and, in step 311, the MS collects the traffic information from the MSs included in the cluster. Here, the traffic information includes a location of a corresponding MS, a movement velocity, a movement direction, a movement angle, and time information. At this time, a message of requesting for transmitting the traffic information to the MSs included in the cluster indicates the MSs included in the cluster, so each of the MSs included in the cluster can know that itself belongs to which cluster.

After that, in step 313, the MS generates a message including traffic information collected up to now and transmits the generated message to a traffic information server and then, returns to step 301. Here, the collected traffic information may correspond to the MS and the other MSs that belong to the cluster. The MS can generate a message including all of the respective traffic information of the other MSs belonging to the cluster and transmit the generated message to the traffic information server, or can distinguish, by each item, the traffic information, obtain an average value, generate a message including only the average value of each item, and transmit the generated message to the traffic information server. Here, the MS can construct a message including traffic information according to Table 1 below and transmit the message to the traffic information server.

TABLE 1

| Element Name | Description | Data Type | Size (Byte) | Remark |
|---|---|---|---|---|
| Encrypted MAC ID | Encrypted ID | String | 16 | |
| Encrypted Location | Encrypted location information | String | 128 | |
| Velocity | Movement velocity | String | 5 | km/h |
| Direction | Movement direction | String | 2 | NW |
| Angle | Movement angle | String | 3 | 0~360 |
| Timestamp | Transmission timestamp | String | 14 | |
| Member Counter | MS count within cluster | String | 5 | |

As illustrated in Table 1, the MS generates a message including an encrypted ID, encrypted location information, a movement velocity, a movement direction, a movement angle, a transmission timestamp, and an MS count within a cluster, and transmit the generated message to the traffic information server. Here, the encrypted ID means an ID encrypting a unique ID of an MS generated from a MAC address according to a predetermined scheme.

Also, in the above description, each message can include at least one of a packet type, an ID of a corresponding MS, an ID of a cluster, an ID of a cluster delegate MS, and timestamp information.

On the other hand, when the current time point does not correspond to the predetermined cluster update period in step 301, the MS proceeds to step 315 and determines if the current time point corresponds to a traffic information update period. When the current time point does not correspond to the traffic information update period, the MS returns to step 301. When the current time point corresponds to the traffic information update period, the MS proceeds to step 317 and collects and measures traffic information and then, proceeds to step 313.

Figure 4:
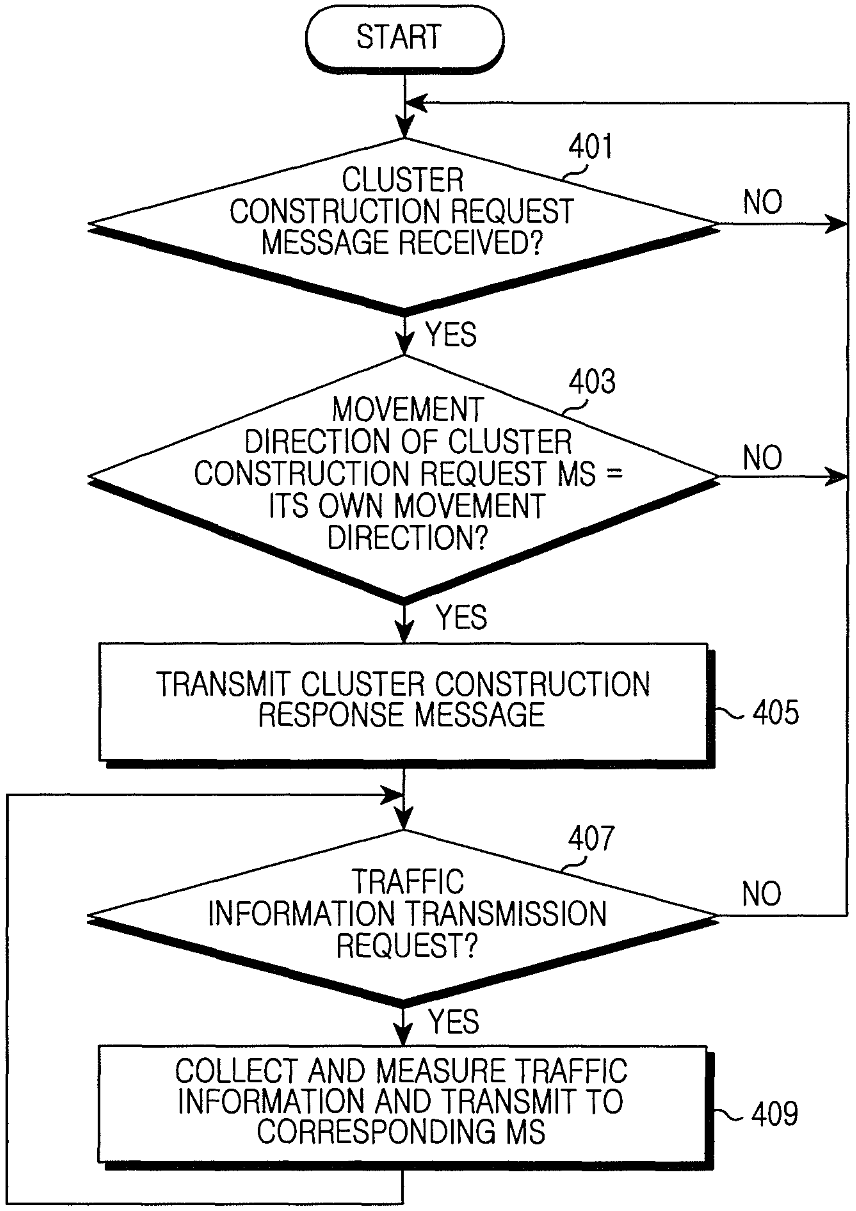
FIG. 4 illustrates a process of constructing a cluster and transmitting traffic information to a delegate Mobile Station (MS) in a mobile communication terminal according to an embodiment of the present invention.

FIG. 4 illustrates a process of constructing a cluster and transmitting traffic information to a delegate MS in a mobile communication terminal according to an embodiment of the present invention.

Referring to FIG. 4, in step 401, the MS determines if a cluster construction request message is received from a specific cluster delegate MS. If the cluster construction request message is received, the MS proceeds to step 403 and acquires a movement direction from the cluster construction request message and compares if the acquired movement direction is the same as its own movement direction. At this time, the cluster construction request message includes a unique cluster ID for identifying a cluster, and movement direction and message transmission timestamp information of the MS. Here, that the MS compares if its own movement direction is the same as the movement direction included in the cluster construction request message is to distinguish an MS moving along an up road lane and an MS moving along a down road lane on the same road and also distinguish MSs moving in different directions in a section where a plurality of roads are interchanged, and thus determine if the cluster construction request message is valid. Also, through the transmission timestamp included in the cluster construction request message, the MS can determine if the cluster construction request message is valid. That is, when the transmission timestamp of the cluster construction request message is out of more than a threshold from the current timestamp, the MS can determine that the cluster construction request message is invalid.

When the movement direction included in the cluster construction request message is not the same as its own movement direction in step 403, the MS disregards the cluster construction request message and returns to step 401. When the movement direction included in the cluster construction request message is the same as its own movement direction, the MS proceeds to step 405 and transmits a cluster construction response message to the cluster delegate MS. At this time, the cluster construction response message includes the cluster ID and message transmission timestamp information.

After that, in step 407, the MS determines if a traffic information transmission request message is received from the cluster delegate MS. When the traffic information transmission request message is not received, the MS returns to step 401. When the traffic information transmission request message is received, the MS proceeds to step 409 and collects and measures traffic information and transmits the traffic information to the cluster delegate MS. After that, the MS returns to step 407.

In FIGS. 3 and 4, a description has been made by way of example of a situation in which, if a cluster delegate MS transmits a request for transmitting traffic information to the other MSs within a cluster, the other MSs within the cluster transmit traffic information to the cluster delegate MS, but, without the request of the cluster delegate MS, the other MSs within the cluster may periodically collect and measure traffic information and transmit the traffic information to the cluster delegate MS.

Figure 5:
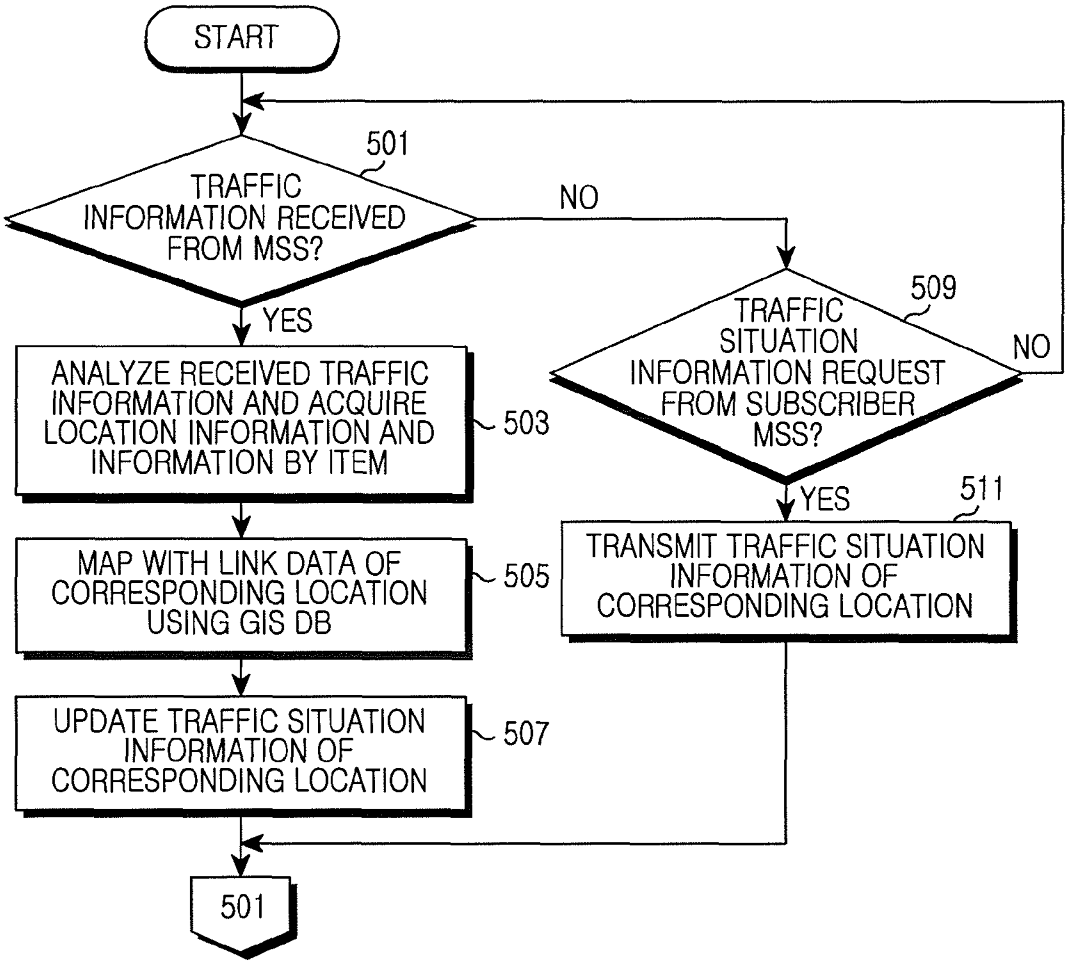
FIG. 5 illustrates a process of collecting traffic information and providing a traffic information service in a traffic information server according to an embodiment of the present invention.

FIG. 5 illustrates a process of collecting traffic information and providing a traffic information service in a traffic information server according to an embodiment of the present invention.

Referring to FIG. 5, in step 501, the traffic information server determines if traffic information is received from an MS. When the traffic information is received from the MS, the traffic information server proceeds to step 503 and analyzes the received traffic information and acquires location information and traffic situation information. That is, the traffic information server tokens serial data received from the MS and acquires information by each item. That is, the MS acquires an ID of a corresponding MS, location information, a movement velocity, a movement direction, a movement angle, a transmission timestamp, and information of the number of MSs within a cluster, from the traffic information.

Next, in step 505, the traffic information server maps link data corresponding to the location information with the acquired traffic information, using a DataBase (DB) of a GIS. Here, the link data indicates a digital ID of each road. That is, the traffic information server searches a digital ID of a road of a corresponding location from the GIS through the location information acquired from the traffic information and then, maps the digital ID with the acquired traffic information.

After that, in step 507, the traffic information server updates traffic situation information on the road of the corresponding location using the acquired traffic information and then, returns to step 501. Here, the traffic situation information on the road of the corresponding location includes velocity information on a corresponding road, status information, and delegate information. Here, the velocity information can be expressed as a movement velocity average of a plurality of MSs located in a corresponding road, and the status information can indicate if a corresponding road section is congested or smooth and the like on the basis of the velocity information. Also, the delegate information means information for a driver to recognize the velocity information and the status information at a glance.

On the other hand, when the traffic information is not received from the MS, the traffic information server proceeds to step 509 and determines if traffic situation information is requested from a subscriber MS of a traffic information service. When the traffic situation information is not requested, the MS returns to step 501. When the traffic situation information is requested, the MS proceeds to step 511 and searches traffic situation information of a corresponding location and transmits the searched traffic situation information to the subscriber MS. Here, if receiving an address or keyword from the subscriber MS, after searching at least one or more roads (or road sections) corresponding to the address or keyword through the GIS, the traffic information server can acquire traffic situation information corresponding to the searched roads and provide the traffic situation information to the subscriber MS. Also, the traffic server itself may receive a digital ID of a road from the subscriber MS and acquire and transmit traffic situation information of the road.

After that, the traffic information server returns to step 501.

Figure 6:
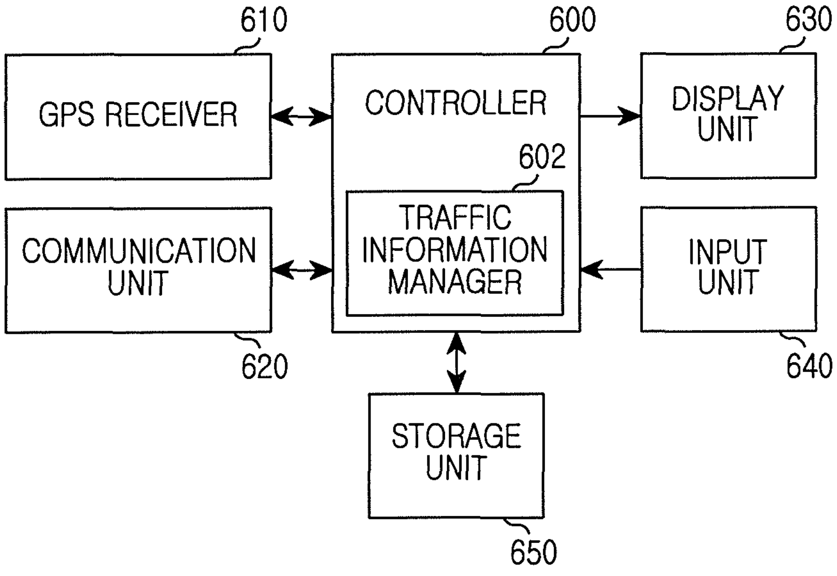
FIG. 6 is a block diagram of a mobile communication terminal according to an embodiment of the present invention.

FIG. 6 is a block diagram of a mobile communication terminal according to an embodiment of the present invention.

Referring to FIG. 6, the MS includes a controller 600, a GPS receiver 610, a communication unit 620, a display unit 630, an input unit 640, and a storage unit 650. The controller 600 includes a traffic information manager 602.

The controller 600 controls and processes a general operation of the MS. The controller 600 controls and processes a function for, by including the traffic information manager 602, collecting and measuring traffic information using location information acquired through the GPS receiver 610 and providing the traffic information to a traffic information server. Also, the controller 600 controls and processes a function for constructing a cluster with the other MSs, and controls and processes a function for collecting traffic information of the other MSs belonging to the same cluster or transmitting the traffic information to a delegate MS of the same cluster. Also, the controller 600 controls and processes a function for generating a unique ID of an MS through a Media Access Control (MAC) address and encrypting the unique ID. Also, the controller 600 controls and processes a function for, when providing traffic information to the traffic information server, encrypting and transmitting location information of an MS.

The GPS receiver 610 acquires location information from a GPS every predetermined period according to the control of the controller 600.

The communication unit 620 performs a function of transceiving a Radio Frequency (RF) wireless signal through an antenna according to the control of the controller 600. That is, the communication unit 620 up converts a baseband signal provided from the controller 600 into an RF signal and transmits the RF signal through the antenna, and down converts an RF signal received through the antenna into a baseband signal and provides the baseband signal to the controller 600.

The display unit 630 displays status information generated during an operation of the MS, numerals, characters, and a variety of moving pictures. The input unit 640 includes a keypad or touch sensor and provides, to the controller 600, data corresponding to a key pressed by a user or a coordinate of a touched location.

The storage unit 650 stores a variety of programs and data necessary for an operation of the MS, and stores traffic information collected according to the control of the controller 600. Also, when the MS constructs a cluster, the controller 650 can store information on the cluster, for example, information of an ID of a cluster, an ID of a cluster delegate MS, IDs of MSs included in the cluster, and the number of MSs included in the cluster.

Figure 7:
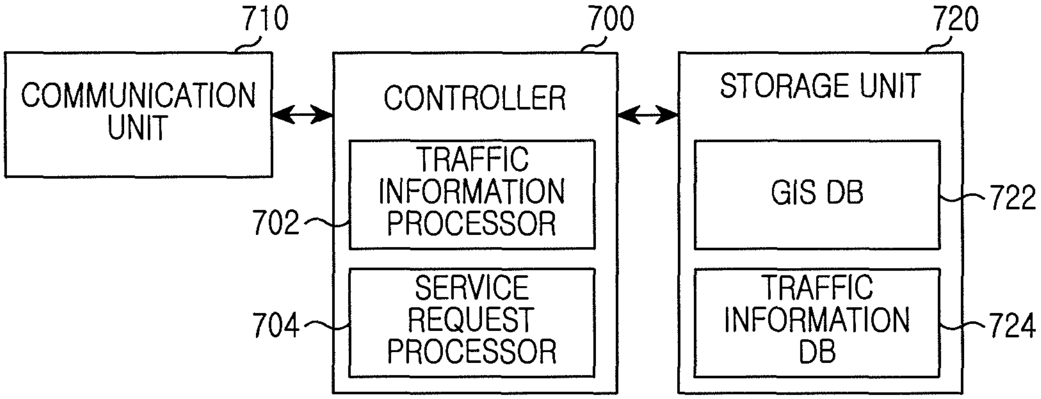
FIG. 7 is a block diagram of a traffic information server according to an embodiment of the present invention.

FIG. 7 is a block diagram of a traffic information server according to an embodiment of the present invention.

Referring to FIG. 7, the traffic information server includes a controller 700, a communication unit 710, and a storage unit 720. The controller 700 includes a traffic information processor 702 and a service request processor 704. The storage unit 720 includes a GIS DB 722 and a traffic information DB 724.

The controller 700 controls and processes a general operation of the traffic information server. The controller 700 controls and processes a function for, by including the traffic information processor 702, analyzing traffic information received from MSs and generating and updating traffic situation information on each road and, by including the service request processor 704, when there is a request for traffic situation information provision from a subscriber MS of a traffic information service, searching and transmitting traffic situation information of roads corresponding to a corresponding location. Also, the traffic information processor 702 controls and processes a function for, after tokening traffic information received from each MS and distinguishing the traffic information by item, acquiring link data corresponding to a location of the MS through the GIS DB 722 and mapping the acquired link data to the traffic information distinguished by item.

The communication unit 710 performs a function for transmitting/receiving an RF wireless signal through an antenna according to the control of the controller 700. That is, the communication unit 710 up converts a baseband signal provided from the controller 700 into an RF signal and transmits the RF signal through the antenna, and down converts an RF signal received through the antenna into a baseband signal and provides the baseband signal to the controller 700.

The storage unit 720 stores a variety of programs and data necessary for an operation of the MS. Particularly, by including the GIS DB 722, the storage unit 720 stores location information on each road and link data (or digital ID) information and, by including the traffic information DB 724, the storage unit 720 stores current traffic situation information on each road. Here, the traffic situation information includes velocity information of a corresponding road, status information, and delegate information.

As described above, in embodiments of the present invention, a plurality of mobile communication terminals construct a cluster, collect traffic information, and transmit the traffic information to a traffic information server and the traffic information server detects a traffic situation through the collected traffic information and provides traffic situation information to an MS requiring the traffic information, there is an effect of being capable of reducing the cost of a separate device for collecting traffic information and, since collecting traffic information from mobile communication terminals scattered in each road, there is an effect of being capable of providing a universal traffic information service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of a mobile station (MS) for a traffic information service, the method comprising:
- constructing a cluster with at least one neighboring MS;
- receiving traffic information from the at least one neighboring MS comprised in the cluster;
- measuring traffic information using location information of the MS;
- transmitting a traffic information message comprising the received traffic information and the measured traffic information to a traffic information provision server;
- transmitting a request for a traffic situation information transmission to the traffic information provision server; and
- receiving traffic situation information corresponding to the traffic situation information request from the traffic information provision server.

2. The method of claim 1, wherein constructing the cluster with the at least one neighboring MS comprises:
- broadcasting a cluster construction request message comprising at least one of movement direction and message transmission timestamp information of the MS;
- receiving a cluster construction response message from the at least one neighboring MS;
- determining if the cluster construction response message is valid using a timestamp transmitting the cluster construction response message; and
- constructing the cluster using the at least one neighboring MS transmitting the valid cluster construction response message.

3. The method of claim 1, further comprising, after constructing the cluster, transmitting a request for traffic information transmission to the at least one neighboring MS comprised in the cluster.

4. The method of claim 1, wherein the traffic information message comprises at least one of an IDentifier (ID) of an MS, location information, a movement velocity, a movement direction, a movement angle, a movement timestamp, and the number of MSs within the cluster.

5. A method of a mobile station (MS) for a traffic information service, the method comprising:
- constructing a cluster with at least one neighboring MS;
- measuring traffic information using location information of the MS; and
- transmitting the measured traffic information to a delegate MS of the cluster, wherein constructing the cluster with the at least one neighboring MS comprises:
  - receiving a cluster construction request message comprising at least one of movement direction and message transmission timestamp information from the cluster delegate MS;
  - determining if the cluster construction request message is valid using the at least one of the movement direction and message transmission timestamp information; and
  - in response to determining that the cluster construction request message is valid, transmitting a cluster construction response message comprising transmission timestamp information.

6. The method of claim 5, further comprising, after constructing the cluster, receiving a request for traffic information transmission from the delegate MS of the cluster,
- wherein the traffic information comprises at least one of an IDentifier (ID) of an MS, location information, a movement velocity, a movement direction, a movement angle, and a movement timestamp.

7. A method of a traffic information server for a traffic information service, the method comprising:
- receiving a traffic information message from at least a first Mobile Station (MS), the first MS representative of a cluster of MSs;
- searching a road corresponding to traffic information included in the traffic information message; and
- generating information representing a traffic situation of the road using the traffic information message,
- wherein the traffic information message received from the first MS includes traffic information from at least a second MS included in the cluster other than the first MS.

8. The method of claim 7, wherein the information representing the traffic situation of the road comprises at least one of velocity information of a corresponding road section, status information, and delegate information.

9. The method of claim 7, further comprising:
- receiving a request for traffic situation information transmission for a specific keyword from a subscriber MS of a traffic information service;
- searching at least one or more road sections corresponding to the specific keyword from the Geographic Information System (GIS); and
- transmitting traffic situation information of the searched road sections, wherein the keyword comprises at least one of an address, a keyword, and a digital ID of a road.

10. An apparatus of a mobile station (MS) for a traffic information service, the apparatus comprising:
- a location information receiver configured to receive location information of the MS;
- a communication unit configured to transmit/receive a signal with at least one neighboring MS and a traffic information provision server; and
- a controller configured to control to construct a cluster with at least one neighboring MS; in response to traffic information being received from the at least one neighboring MS comprised in the cluster through the communication unit, and measure traffic information using the location information of the MS, wherein the communication unit is configured to transmit a traffic information message comprising the received traffic information and the measured traffic information to the traffic information provision server, transmit a request for a traffic situation information transmission to the traffic information provision server, and receive traffic situation information corresponding to the traffic situation information request from the traffic information provision server.

11. The apparatus of claim 10, wherein the controller is configured to control the communication unit to broadcast a cluster construction request message comprising at least one of movement direction and message transmission timestamp information of the MS; in response to a cluster construction response message being received from the at least one neighboring MS through the communication unit; determine if the cluster construction response message is valid using a timestamp transmitting the cluster construction response message; and construct the cluster using the, at least one neighboring MS transmitting the valid cluster construction response message.

12. The apparatus of claim 10, wherein, after constructing the cluster, the controller is configured to control the communication unit to transmit a request for traffic information transmission to the at least one neighboring MS comprised in the cluster.

13. The apparatus of claim 10, wherein the traffic information message comprises at least one of an IDentifier (ID) of an MS, location information, a movement velocity, a movement direction, a movement angle, a movement timestamp, and the number of MSs within the cluster.

14. An apparatus of a mobile station (MS) for a traffic information service, the apparatus comprising:

a location information receiver configured to receive location information of the MS;

a communication unit configured to transmit/receive a signal with at least one neighboring MS and a traffic information provision server; and a controller configured to control to construct a cluster with the at least one neighboring MS, measure traffic information using location information of the MS, and transmit the measured traffic information to a delegate MS of the cluster, wherein:

in response to a cluster construction request message comprising at least one of movement direction and message transmission timestamp information being received from the cluster delegate MS through the communication unit, the controller is configured to determine if the cluster construction request message is valid using the at least one of the movement direction and message transmission timestamp information, and in response to the cluster construction request message being valid, the controller is configured to control the communication unit to transmit a cluster construction response message comprising transmission timestamp information.

15. The apparatus of claim 14, wherein the communication unit is configured to receive a signal of requesting traffic information transmission from the delegate MS of the cluster, and wherein the traffic information comprises at least one of an IDentifier (ID) of an MS, location information, a movement velocity, a movement direction, a movement angle, and a movement timestamp.

16. An apparatus of a traffic information server for a traffic information service, the apparatus comprising:

a communication unit configured to receive a traffic information message from at least a first Mobile Station (MS), the first MS representative of a cluster of MSs; and a controller configured to search a road corresponding to traffic information included in the traffic information message, and generate information representing a traffic situation of the road using the traffic information message, wherein the traffic information message received from the first MS includes traffic information from at least a second MS included in the cluster other than the first MS.

17. The apparatus of claim 16, wherein the information representing the traffic situation of the road comprises at least one of velocity information of a corresponding road section, status information, and delegate information.

18. The apparatus of claim 16, wherein the communication unit is configured to receive a signal of requesting traffic situation information transmission for a specific keyword from a subscriber MS of a traffic information service, wherein the controller is configured to search one or more road sections corresponding to the specific keyword from the Geographic Information System (GIS), and control the communication unit to transmit traffic situation information of the searched road sections, and wherein the keyword comprises at least one of an address, a keyword, and a digital ID of a road.

19. The method of claim 7, wherein the traffic information message received from the first MS including traffic information measured by and collected from the second MS.

20. The apparatus of claim 16, wherein the traffic information message received from the first MS includes traffic information measured by and collected from the second MS.

* * * * *